Sept. 15, 1925.　　　　　J. H. ASHBAUGH　　　　　1,554,174
REGULATOR SYSTEM
Filed March 30, 1921
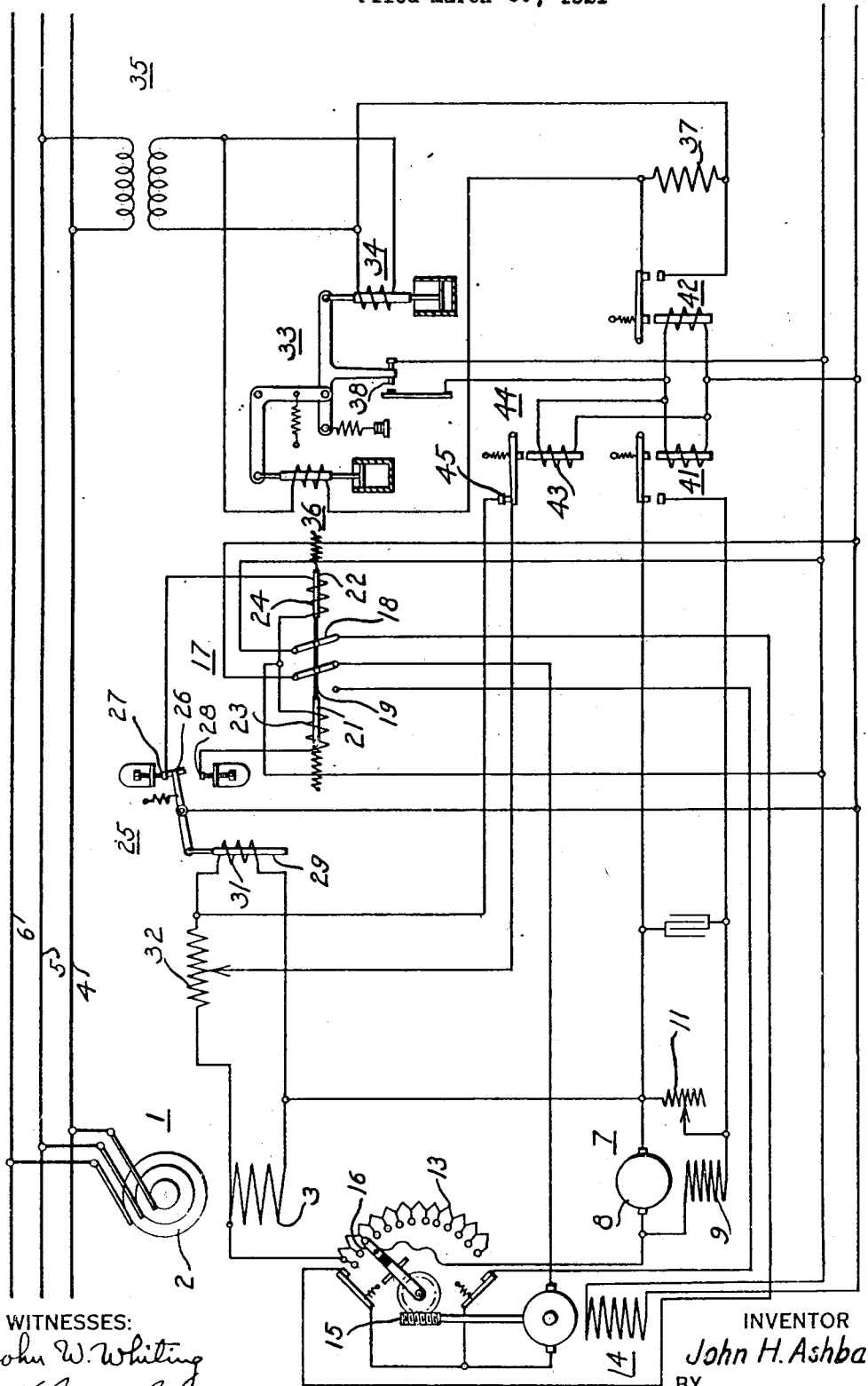
WITNESSES:
John W. Whiting
M Theodore Simmons
INVENTOR
John H. Ashbaugh
BY
Wesley G. Carr
ATTORNEY Patented Sept. 15, 1925.

1,554,174

UNITED STATES PATENT OFFICE.

JOHN H. ASHBAUGH, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed March 30, 1921. Serial No. 456,797.

*To all whom it may concern:*

Be it known that I, JOHN H. ASHBAUGH, a citizen of the United States, and a resident of Wilkinsburg, in the county of Allegheny and State of Pennsylvania, have invented a new and useful Improvement in Regulator Systems, of which the following is a specification.

My invention relates to electric regulator systems and has special relation to such systems for maintaining substantially-constant voltage upon supply circuits.

One object of my invention is to provide a regulator system that shall be quickly responsive to correct changes of voltage upon the supply circuit and be operative over a wider range of voltage changes than has heretofore been possible in regulators of this type.

Another object of my invention is to provide a regulator system of the above-indicated character that shall embody means for effecting a preliminary or rough adjustment of the excitation of a dynamo-electric machine and other means for obtaining a final or minute adjustment of such excitation, and shall include means for extending the operating range of these regulating means.

A system of this general class is illustrated and described in the application of H. A. Travers, Serial No. 254,207, filed Sept. 16, 1918. In brief, the system illustrated therein comprises an alternating-current generator or a synchronous condenser, which is connected to a supply circuit, and the field-magnet winding of which is excited by means of an auxiliary generator. A vibrating contact type of regulator, such as the well-known "Tirrill" regulator, is provided for adjusting the voltage of the exciter in accordance with the supply-circuit voltage. A motor-operated rheostat is connected in circuit with the field-magnet winding of the controlled machine, which is adjusted in accordance with the variations in the exciter voltage. In order to extend the range of operation of these regulating mediums, a resistor is included in circuit with the operating winding of the switch for governing the energization of the rheostat motor, which resistor is short-circuited by means also connected across the terminals of the field-magnet winding of the main machine.

In the system of the present application, the means for extending the range of operation of the regulators comprises an electromagnet connected in parallel relation with the energizing windings of the operating relays of the vibratory regulator, each of which windings is connected to be energized by the exciter voltage. Accordingly, the effective value of the resistor in circuit with the switch operating coil controlling the energization of the rheostat motor is regulated by a vibratory electromagnet which, in turn, is controlled by variations in the supply-circuit voltage and energized in accordance with the exciter voltage.

Referring to the drawing, the single figure is a diagrammatic illustration of the circuits and apparatus embodying my invention.

A main generator 1, having an armature 2 and a field-magnet winding 3, is connected to supply conductors 4, 5 and 6. Field-magnet winding 3 is adapted to be energized by an auxiliary exciter generator 7 having an armature 8 and a field-magnet winding 9. In circuit with the field-magnet winding 9 is an adjustable resistor 11.

Connected in circuit between the exciter 7 and the field-magnet winding 3 is a motor-operated rheostat 12, comprising resistor 13 and pilot motor 14, which operates worm gear mechanism 15 to control the movement of a rheostat arm 16. The energization of the pilot motor 14 is controlled by a reversing switch 17, comprising switch members 18 that are connected to a lever 19, upon the opposite ends of which are core armatures 21 and 22, respectively. Operating windings 23 and 24, respectively co-operate with the core armatures to move the switch members 18 into engagement with the one or the other set of co-operating contact terminals to operate the pilot motor 14 in the one direction or the other. The energization of the electromagnet windings 23 and 24 is controlled by a switch 25, comprising a contact-carrying lever 26 for engaging contact terminals 27 and 28 in its respective positions. Contact terminal 27 is in circuit with coil 24 and terminal 28 is in circuit with coil 23.

When the armatures 21 and 22 are unenergized, the lever 19 is maintained in a middle or neutral position by springs attached to the ends thereof.

Attached to the lever 26 is a core armature 29 that is adapted to be operated by a winding 31, which is connected across the field-magnet winding 3, so as to be operated in accordance with the variations in the excitation thereof. Included in circuit with the coil 31 is a resistor 32. The control of the shunt circuit for this resistor will be hereinafter described.

The foregoing apparatus accomplishes what may be termed the rough or preliminary regulation of the excitation of the field winding of the main machine, in accordance with its variations, to maintain a substantially constant supply-circuit voltage.

The herein illustrated system also includes a regulator adapted to accomplish the more minute regulation of such excitation. Such a regulator is herein designated by the reference character 33 and is of the well-known vibratory or "Tirrill" type. As is customary in this type of regulator, the main control magnet 34 is energized in accordance with the supply-circuit voltage by means of a transformer 35. A second control magnet 36, adapted to insure the vibratory action of the regulator, is likewise energized in accordance with the supply-circuit voltage and has a resistor 37 in circuit therewith. The main contact members 38 control the circuit to operating relays 41 and 42 which are connected across the terminals of the exciter machine 7. Relay 42 controls the shunt circuit around the resistor 37, which is in circuit with the vibratory magnet 36. Relay 41 controls a shunt circuit about the resistor 11, which is in circuit with the exciter field-magnet winding 9. Accordingly, variations in supply-circuit voltage will cause the resistors 11 and 37 to be respectively short-circuited in a manner to effect the necessary correction. Inasmuch as the operation of this apparatus is well known, no detailed reference will be made thereto.

The present invention contemplates connecting in parallel relation to the relays 41 and 42 the winding 43 of an electromagnet 44. The contact members 45 of this electromagnet control the shunt circuit for the resistor 32, which is in circuit with winding 31 of switch mechanism 25.

From the preceding description, it will be apparent that variations in the field excitation of field-magnet winding 3 will vary the energization of winding 31 to move reversing switch 17 to operate the pilot motor 14 in one direction or the other to move the rheostat arm 16 so as to compensate for such variation. At the same time, the regulator 33, will vary the operation of the exciter machine to maintain the generated voltage substantially constant, in accordance with the electrical condition of the supply circuit.

Since the regulator 33 vibrates, the relays 41 and 42 will have a vibratory action; and, since the coil of electromagnet 44 is subject to the same control as relays 41 and 42, it likewise will have a vibratory action. Accordingly, the mean effective value of the resistor 32 in circuit with the coil 31, is controlled in accordance with the vibrations of the electromagnet 44. In addition, the windings of relays 41 and 42 and electromagnet 44 being connected across the exciter armature, they are energized in accordance with variations in the excitation of the main field-magnet winding.

Accordingly, the ultimate effective value of the resistor 32, in circuit with winding 31 of switch mechanism 25, will change in accordance with exciter variations. By reason of the fact that electromagnet 44 is an inverted magnet, that is to say, having its contact members normally closed variations in the value of the resistor 32 will be at an inverse ratio to the variations of the exciter voltage.

It will thus be apparent that the range of operation of switch mechanism 25 and, hence, the regulation controlled thereby, will be extended over a range which is unlimited by the action of a magnet set to respond only at a predetermined voltage, since such range is herein controlled by the vibratory magnet 44.

Not only will the operative range of this regulating mechanism be extended, but the range of operation of the vibratory regulator will also be extended. That is, should the exciter voltage become so low that the coils of relays 41 and 42 and electromagnet 44 will have insufficient energization to operate their respective armatures, the resistor 32 will be shunted and, hence, switch 25 will have a different setting. This action will operate the pilot motor to change the resistance of the exciter circuit. Hence, the coils of the relays and electromagnet will again be energized and the vibratory regulator will also be operative over the new range.

Modifications in the system and arrangement and location of parts may be made within the spirit and scope of my invention, and such modifications are intended to be covered by the appended claims.

I claim as my invention:—

1. The combination with a synchronous condenser connected to an alternating-current supply circuit, an exciter generator for energizing the condenser field winding, and having an armature and a field-magnet winding, and a motor-operated rheostat connected in series relation with the generator, of means comprising an electromagnet controlled in accordance with the potential of the condenser field winding for operating said rheostat, and another electromagnet adapted to increase the operating range of the first-mentioned electromagnet, said second electromagnet being vibrated in accordance with the variations in the supply circuit.

2. The combination with a dynamo-electric machine connected to an alternating-current supply circuit, an exciter generator having an armature and a motor-operated rheostat connected in circuit with the generator, of means comprising an electromagnet adapted to control the operation of said rheostat, and vibratory electroresponsive means adapted to extend the range of operation of said electromagnet.

3. The combination with a dynamo-electric machine to be regulated having an armature and a field-magnet winding, an exciter generator in circuit with said field-magnet winding and a motor-operated rheostat in circuit therewith, of means for controlling said rheostat and vibratory means for extending the range of operation of said controlling means.

4. The combination with a dynamo-electric machine to be regulated having an armature and a field-magnet winding, an exciter generator in circuit with said field-magnet winding and a motor-operated rheostat in circuit therewith, of electroresponsive means for controlling said rheostat and vibratory means for extending the range of operation of said electroresponsive means.

5. The combination with a dynamo-electric machine to be regulated having an armature and a field-magnet winding, an exciter generator in circuit with said field-magnet winding and a motor-operated rheostat in circuit therewith, of vibratory electroresponsive means for controlling said rheostat and vibratory means for extending the range of operation of said electroresponsive means.

6. The combination with a supply circuit having connected thereto a dynamo-electric machine to be regulated having an armature and a field-magnet winding, an exciter generator in circuit with said field-magnet winding and a motor-operated rheostat in circuit therewith, of vibratory electroresponsive means for controlling said rheostat and vibratory means for extending the range of operation of said electroresponsive means controlled in accordance with the supply-circuit voltage.

7. The combination with a dynamo-electric machine connected to an alternating-current supply circuit, an exciter generator for energizing the machine field-magnet winding, and means for varying the excitation of said field-magnet winding, of means for controlling the excitation of said field-magnet winding in accordance with the potential impressed upon said field-magnet winding, comprising means adapted to operate within predetermined limits, and vibratory means adapted to increase the operating range of the first-mentioned means.

8. The combination with a dynamo-electric machine connected to an alternating-current supply circuit, an exciter generator for energizing the machine field-magnet winding, and means for varying the excitation of said field-magnet winding, of means for controlling the excitation of said field-magnet winding comprising electroresponsive means controlled by the potential impressed upon said field-magnet winding and adapted to operate within predetermined limits, and vibratory means adapted to increase the operating range of the first-mentioned means.

9. The combination with a dynamo-electric machine connected to an alternating-current supply circuit, an exciter generator for energizing the machine field-magnet winding, and means for varying the excitation of said field-magnet winding, of means for controlling the excitation of said field-magnet winding comprising electroresponsive means controlled by the potential impressed upon said field-magnet winding and adapted to operate within predetermined limits, and vibratory electroresponsive means adapted to increase the operating range of the first-mentioned means.

10. The combination with a dynamo-electric machine connected to an alternating-current supply circuit, an exciter generator for energizing the machine field-magnet winding, and means for varying the excitation of said field-magnet winding, of means for controlling the excitation of said field-magnet winding comprising electroresponsive means controlled by the potential impressed upon said field-magnet winding and adapted to operate within predetermined limits, and vibratory electroresponsive means adapted to increase the operating range of the first-mentioned means controlled in accordance with supply-circuit voltage.

11. The combination with a dynamo-electric machine connected to a supply circuit, an exciter generator for energizing the field winding of said machine, a resistor disposed in the circuit of the machine field winding and the exciter generator, and means comprising a motor for controlling said resistor in accordance with the potential impressed across the machine field winding to permit the exciter generator to operate within predetermined limits, of switching means for governing the rotation of the motor in a forward and in a reverse direction, means for increasing the operating range of said switching means, and vibratory means for extending the range of operation of said first-mentioned means.

12. The combination with a dynamo-electric machine connected to a supply circuit, an exciter generator for energizing the field winding of said machine, a resistor disposed in the circuit of the machine field winding and the exciter generator, and means comprising a motor for controlling said resistor in accordance with the potential impressed across the machine field winding to permit the exciter generator to operate within predetermined limits, of switching means for governing the rotation of the motor in a forward and in a reverse direction, and vibratory means for increasing the operating range of said switching means, and means for also governing the exciter voltage in accordance with the voltage obtaining in the supply circuit.

13. The combination with a dynamo-electric machine connected to a supply circuit, an exciter generator for energizing the field winding of said machine, a resistor disposed in the circuit of the machine field-magnet winding and the exciter generator, and means comprising a motor for controlling said resistor in accordance with the potential impressed across the machine field-magnet winding to permit the exciter generator to operate within predetermined limits, of switching means for governing the rotation of the motor in a forward and in a reverse direction, and vibratory electroresponsive means for increasing the operating range of said switching means, and means for also governing the exciter voltage in accordance with the voltage obtaining in the supply circuit.

14. The combination with a synchronous condenser connected to an alternating-current supply circuit, an exciter generator having an armature and a field winding for energizing the condenser field-magnet winding, a resistor in circuit with the generator field-magnet winding, a rheostat connected in series relation with the generator armature, and a motor for operating said rheostat, of means comprising an electromagnet controlled by the potential impressed across the condenser field-magnet winding for operating said rheostat motor, a resistance element in the energizing circuit of said electromagnet, vibratory means for controlling said element and means associated with said resistor for varying the excitation of the generator in accordance with the voltage obtaining in the supply circuit.

15. The combination with a synchronous condenser connected to an alternating-current supply circuit, an exciter generator having an armature and a field-magnet winding for energizing the condenser field-magnet winding, a resistor in circuit with the generator field-magnet winding, a rheostat connected in series relation with the generator armature, and a motor for operating said rheostat, of means comprising an electromagnet controlled by the potential impressed across the condenser field-magnet winding for operating said rheostat motor, a resistance element in the energizing circuit of said electromagnet, vibratory electroresponsive means for controlling said element and means associated with said resistor for varying the excitation of the generator in accordance with the voltage obtaining in the supply circuit.

16. The combination with a synchronous condenser connected across a supply circuit, an exciter generator having an armature and a field-magnet winding for energizing the condenser field-magnet winding, and a motor-operated rheostat disposed in series relation with the generator armature and the condenser field-magnet winding, of means comprising an electromagnet connected across the condenser field-magnet winding for operating said rheostat in accordance with variations in potential of the condenser field-magnet winding, a resistance element in the energizing circuit of said electromagnet, vibratory means for controlling said element, and means for varying the excitation of the generator in accordance with the voltage obtaining in the supply circuit.

17. The combination with a synchronous condenser connected across a supply circuit, an exciter generator having an armature and a field-magnet winding for energizing the condenser field-magnet winding, and a motor-operated rheostat disposed in series relation with the generator armature and the condenser field-magnet winding, of means comprising an electromagnet connected across the condenser field-magnet winding for operating said rheostat in accordance with variations in the potential of the condenser field-magnet winding, a resistance element in the energizing circuit of said electromagnet, vibratory electroresponsive means for controlling said element, and means for varying the excitation of the generator in accordance with the voltage obtaining in the supply circuit.

18. The combination with a dynamo-electric machine to be regulated having means associated therewith for accomplishing a preliminary regulation of said machine, and other means adapted to accomplish the further regulation of said machine, of vibratory means for determining the range of operation of one of said regulating means.

19. The combination with a dynamo-electric machine to be regulated having means associated therewith for accomplishing a preliminary regulation of said machine and vibratory means adapted to accomplish a further regulation of said machine, of means controlled by said vibratory means for extending the range of operation of one of said regulating means.

20. The combination with a supply circuit having connected thereto a dynamo-electric machine to be regulated having an armature and a field-magnet winding, means controlled in accordance with the potential of the field-magnet winding for accomplishing the preliminary regulation of said machine, and means controlled in accordance with the supply-circuit voltage adapted to accomplish a further regulation of said machine, of vibratory means for extending the range of operation of one of said regulating means.

21. The combination with a supply circuit having connected thereto a dynamo-electric machine to be regulated having an armature and a field-magnet winding, means controlled in accordance with the potential of the field-magnet winding for accomplishing the preliminary regulation of said machine and vibratory means controlled in accordance with supply-circuit voltage adapted to accomplish a further regulation of said machine, of means controlled by said vibratory means for extending the range of operation of the preliminary regulator.

22. The combination with a supply circuit having connected thereto a dynamo-electric machine to be regulated having means associated therewith for accomplishing a preliminary regulation of said machine, said means comprising an electroresponsive device having a resistor in circuit therewith, and second means adapted to accomplish a further regulation of said machine, of vibratory means controlled by said second regulating means for controlling said resistor to extend the range of operation of said first regulating means.

23. The combination with a supply circuit having connected thereto a dynamo-electric machine to be regulated having an armature and a field-magnet winding, means controlled in accordance with the potential of the field-magnet winding for accomplishing the preliminary regulation of said machine, said means comprising an electroresponsive device having a resistor in circuit therewith, and second means controlled in accordance with supply-circuit voltage adapted to accomplish a further regulation of said machine, of vibratory means controlled by said second regulating means for controlling said resistor to extend the range of operation of said first regulating means.

24. The combination with a supply circuit having connected thereto a dynamo-electric machine to be regulated having an armature and a field-magnet winding, means controlled in accordance with the potential of the field-magnet winding for accomplishing the preliminary regulation of said machine, and means controlled in accordance with the supply-circuit voltage adapted to accomplish a further regulation of said machine, of vibratory means for determining the range of operation of one of said regulating means.

25. The combination with a supply circuit having connected thereto a dynamo-electric machine to be regulated having an armature and a field-magnet winding, means controlled in accordance with the potential of the field-magnet winding for accomplishing the preliminary regulation of said machine and vibratory means controlled in accordance with supply-circuit voltage adapted to accomplish a further regulation of said machine, of means controlled by said vibratory means for determining the range of operation of the preliminary regulator.

26. The combination with a dynamo-electric machine to be regulated having means associated therewith for accomplishing a preliminary regulation of said machine, and other means adapted to accomplish the further regulation of said machine, of vibratory means for determining the range of operation of said regulating means.

27. The combination with a dynamo-electric machine to be regulated having means associated therewith for accomplishing a preliminary regulation of said machine and vibratory means adapted to accomplish a further regulation of said machine, of means controlled by said vibratory means for extending the range of operation of said regulating means.

28. The combination with a supply circuit having connected thereto a dynamo-electric machine to be regulated having an armature and a field-magnet winding, means controlled in accordance with the potential of the field-magnet winding for accomplishing the preliminary regulation of said machine, and means controlled in accordance with the supply-circuit voltage adapted to accomplish a further regulation of said machine, of vibratory means for extending the range of operation of said regulating means.

29. The combination with a supply circuit having connected thereto a dynamo-electric machine to be regulated having an armature and a field-magnet winding, means controlled in accordance with the potential of the field-magnet winding for accomplishing the preliminary regulation of said machine and vibratory means controlled in accordance with supply-circuit voltage adapted to accomplish a further regulation of said machine, of means controlled by said vibratory means for extending the range of operation of the regulators.

30. The combination with a supply circuit having connected thereto a dynamo-electric machine to be regulated having means associated therewith for accomplishing a preliminary regulation of said machine, said means comprising an electroresponsive device having a resistor in circuit therewith, and second means adapted to accomplish a further regulation of said machine, of vibratory means controlled by said second regulating means for controlling said resistor to extend the range of operation of both of said regulating means.

31. The combination with a supply circuit having connected thereto a dynamo-electric machine to be regulated having an armature and a field-magnet winding, means controlled in accordance with the potential of the field-magnet winding for accomplishing the preliminary regulation of said machine, said means comprising an electroresponsive device having a resistor in circuit therewith, and second means controlled in accordance with supply-circuit voltage adapted to accomplish a further regulation of said machine, of vibratory means controlled by said second regulating means for controlling said resistor to extend the range of operation of said regulating means.

32. The combination with a dynamo-electric machine to be regulated having an armature and a field-magnet winding, an exciter generator in circuit with said field-magnet winding and a motor-operated rheostat in circuit therewith, of electroresponsive means for controlling said rheostat and vibratory means for extending the range of operation of said electroresponsive means.

33. The combination with a supply circuit having connected thereto a dynamo-electric machine to be regulated having means associated therewith for accomplishing a preliminary regulation of said machine, said means comprising an electroresponsive device having a resistor in circuit therewith, and second means adapted to accomplish a further regulation of said machine, of means controlled by said second regulating means for controlling said resistor to extend the range of operation of said first regulating means.

34. The combination with a supply circuit having connected thereto a dynamo-electric machine to be regulated having an armature and a field-magnet winding, means controlled in accordance with the potential of the field-magnet winding for accomplishing the preliminary regulation of said machine, said means comprising an electroresponsive device having a resistor in circuit therewith, and second means controlled in accordance with supply-circuit voltage adapted to accomplish a further regulation of said machine, of means controlled by said second regulating means for controlling said resistor to extend the range of operation of said first regulating means.

In testimony whereof, I have hereunto subscribed my name this 23rd day of March 1921.

JOHN H. ASHBAUGH.